Patented Dec. 18, 1928.

1,695,270

UNITED STATES PATENT OFFICE.

LOUIS E. BARTON AND CHARLES J. KINZIE, OF NIAGARA FALLS, NEW YORK, ASSIGNORS TO TITANIUM PIGMENT COMPANY, INC., OF NEW YORK, N. Y., A CORPORATION OF MAINE.

METHOD OF OBTAINING TITANIC OXIDE.

No Drawing.   Application filed February 16, 1925.   Serial No. 9,415.

Our present invention relates to the obtainment, or concentration, of titanic oxide ($TiO_2$) from materials, for example ores, in which it is entangled with undesired substances, including iron compounds.

The objects of our invention comprise provision of procedures by aid of which a desirable titanic oxide product is obtainable in condition more suitable for certain uses, such as pigments, and with greater economy and yield than heretofore.

We attain our said objects by aid of our invention, hereinafter described, and which is, in part, attributable to our discovery that said materials, or ores, differ greatly in their respective chemical constitutions and resistances to decomposition by chemical reagents, and that this is also, particularly, true of therein contained titanium minerals, or compounds.

For example, in those often designated as "ilmenite ores", the titanium minerals are usually predominantly, if not altogether, in the form of ilmenite, or ferrous titanate, ($FeTiO_3$), while in others, usually known as "rutile ores", the titanium minerals are for the most part, if not altogether, in the form of rutile, or titanic oxide ($TiO_2$); while in other ores are found not only both, but even also more or less of other titanium compounds in various proportions.

Hitherto titanic oxide has been usually derived from such titaniferous ores by aid of more or less indiscriminately treating them according to one of three well-known procedures. For example—(1): by heating the ore with sulphuric acid to form water soluble sulphates of titanium and other bases; dissolving, or diluting the product, and withdrawing resulting titanium compounds; or (2): by fusing the ore at red heat with an acid alkali metal sulphate to form water soluble sulphates and dissolving and withdrawing said compounds; or (3): by fusing the ore at red heat with alkaline fluxes such as sodium hydrate, sodium carbonate, or sodium sulphide, whereby the titanic oxide, and other bases such as iron, are converted to more soluble forms which are then dissolved in acids and the resulting titanium compounds withdrawn.

Such procedures, however successful, have, however, in many instances and for certain purposes, failed more or less as regards economy, yield, or purity of product, this being, as we now find, largely attributable to the above referred to differences in composition and in resistance to decomposition by chemical reagents. For instance, the aforesaid old sulphuric acid method being, although relatively economical and efficient where ilmenite is principally concerned, has proved incompetent to as readily, or as completely, as desirable decompose rutile therewith associated, or ores containing the latter in preponderance. And while it is true that substantially all titanium ores ultimately decompose by aid of the above referred to fusion methods, this is at such cost and inconvenience as too often renders their use undesirable, if not prohibitory.

We have discovered that substantially all titaniferous materials, or ores, with which we are acquainted, and including particularly those which are not satisfactorily dealt with by the said sulphuric acid treatment, can be comparatively much more readily, economically, and efficiently decomposed by mixing and heating them at indicated temperatures with not only sulphuric acid, but also and simultaneously, with an alkali metal sulphate, or bi-sulphate such as nitre cake, to formation of water soluble salts, which are subsequently dissolved and the titanium separated from other bases;—the operation being accordingly, as it were, of a duplex, or "binary", character as regards the principal decomposing reagents which are simultaneously and coactively employed.

The following example of our working of the invention will, we believe, enable those skilled in the art to better understand and practice it.

An ore containing by analysis:

Titanic oxide_____ 55.90
Ferrous oxide_____ 15.80
Ferric oxide _____ 18.56
                                     ——————
                                       90.26 was milled to preferably a fineness of about 300 mesh (or as coarse as 200 mesh might answer).

One hundred parts by weight of this comminuted product were thoroughly incorporated with 200 parts of 94% sulphuric acid and 70 parts of nitre cake; the nitre cake being melted in the sulphuric acid at about 100° C. and the comminuted ore then mixed in, the mixing being conveniently performed in the iron reaction vessel in which the charge was to be heated.

The charge in the form of a thin slurry was then heated, while being agitated, to about 200° C. when a vigorous reaction took place, the charge becoming pasty when its agitation was discontinued. The temperature was then raised to about 350° C. and so maintained between one and two hours, the stiff pasty mass thereby gradually passing over into a semi-dry condition. (N. B. This temperature and time of heating may be varied somewhat according to the kind of ore used. Frequently temperatures lower than 350° C. are satisfactory, but seldom, if ever, is a temperature higher than 350° C. required.)

The charge, or resulting conglomeration, was then withdrawn from the reaction vessel, broken up, and dissolved in about 1.5 parts by weight of water to solution of its titanic, iron and other sulphates. The undissolved residues were then withdrawn (in this instance by filtration), and the titanic oxide separated from other bases in the clear solution by heating under the usual well known conditions required for obtaining a titanic oxide product suitable for use as, or in, pigments for paints or other purposes.

It will be understood that the proportions of materials, temperatures and durations of treatment given in the example were such as to yield satisfactory results from the particular materials described, but we do not limit ourselves to those proportions as different materials, or ores, may, as will be understood by those skilled in the art, require such variations as may be indicated in order to obtain therefrom the best possible results.

Our method has several important advantages over the older methods of operation:

(a) It is practically and successfully applicable to substantially every titaniferous ore known to us, including a large number of those which are commercially important though particularly refractory;

(b) Such ores can thereby be treated at relatively moderate temperatures, i. e. higher than those permissible by the old sulphuric acid method, but also far below those required by the other former fusion methods above referred to;

(c) The decomposition of such ores is substantially complete and correspondingly the recovery of titanic oxide therefrom is, by our said duplex or binary method, unprecedentedly high;

(d) Our method is comparatively economical as regards consumption of chemical reagents and can be well and conveniently conducted in equipment of simple and rugged construction.

We claim as our invention:

1. The method of obtaining titanic oxide from titaniferous ores which comprises mixing and heating said ores together with sulphuric acid and an alkali metal sulphate to formation of water soluble salts, but without fusion, dissolving the reaction mass in water to a solution of titanic and other sulphates, withdrawing therefrom undissolved residues, and separating titanic oxide from said solution by heating it.

2. The method of obtaining titanic oxide from titaniferous ores which comprises mixing and heating said ores together with sulphuric acid and nitre cake to formation of water soluble salts, but without fusion, dissolving the reaction mass in water to a solution of titanic and other sulphates, withdrawing therefrom undissolved residues, and separating titanic oxide from said solution by heating it.

3. In obtaining titanic oxide from titaniferous ores, the step which consists in mixing and heating said ores together with sulphuric acid and an alkali metal sulphate to formation of water soluble salts, but without fusion.

4. In obtaining titanic oxide from titaniferous ores, the step which consist in mixing and heating said ores together with sulphuric acid and nitre cake to formation of water soluble salts, but without fusion.

5. The method of obtaining titanic oxide from titaniferous ores which comprises simultaneously mixing and heating said ores together with sulphuric acid and an alkali metal sulphate to formation of water soluble salts, but without fusion, dissolving the reaction mass in water to a solution of titanic and other sulphates, withdrawing therefrom undissolved residues, and separating titanic oxide from said solution by heating it.

6. In obtaining titanic oxide from titaniferous ores, the step which consists in simultaneously mixing and heating said ores together with sulphuric acid and an alkali metal sulphate to formation of water soluble salts, but without fusion.

7. In obtaining titanic oxide from titaniferous ores, the steps which consist in mixing said ores in comminuted form with sulphuric acid and an alkali metal sulphate, then heating and agitating the charge to a temperature not to exceed 350° C. to formation of water soluble salts, but without fusion.

8. In obtaining titanic oxide from titaniferous ores, the steps which consist in mixing said ores in comminuted form with sulphuric acid and nitre cake, then heating and agitating the charge to a temperature not to exceed 350° C. to formation of water soluble salts but without fusion.

LOUIS E. BARTON.
CHARLES J. KINZIE.